United States Patent [19]

Grassman et al.

[11] Patent Number: 4,823,340

[45] Date of Patent: Apr. 18, 1989

[54] CIRCUIT ARRANGEMENT FOR NON-BLOCKING SWITCHING OF PCM CHANNELS IN THE SPACE AND TIME DOMAIN

[75] Inventors: Wolfgang Grassman, Backnang; Walter Berner, Leutenbach; Günter Müller, Oppenweiler, all of Fed. Rep. of Germany

[73] Assignee: ANT Nachrichtentechnik GmbH, Backnang, Fed. Rep. of Germany

[21] Appl. No.: 129,959

[22] Filed: Dec. 4, 1987

[30] Foreign Application Priority Data

Dec. 5, 1986 [DE] Fed. Rep. of Germany ....... 3641561
Jun. 23, 1987 [DE] Fed. Rep. of Germany ....... 3720644

[51] Int. Cl.$^4$ ............................................. H04Q 11/04
[52] U.S. Cl. ......................................... 370/58; 370/60; 370/66
[58] Field of Search ...................... 370/58, 53, 60, 66, 370/64, 94

[56] References Cited

U.S. PATENT DOCUMENTS

| | | | |
|---|---|---|---|
| 4,455,648 | 6/1984 | Binz et al. | 370/58 |
| 4,484,323 | 11/1984 | Beuscher et al. | 370/58 |
| 4,484,324 | 11/1984 | Orsic | 370/58 |
| 4,564,936 | 1/1986 | Takahashi | 370/58 |
| 4,627,046 | 12/1986 | Bellamy | 370/58 |
| 4,656,621 | 4/1987 | Cooperman et al. | 370/59 |
| 4,736,361 | 4/1988 | Cooperman et al. | 370/58 |

OTHER PUBLICATIONS

"Baseband Switches and Transmultiplexers for Use in an On-Board Processing Mobile/Business Satellite System", by Evans et al., ICDSC 7, pp. 587-592.

"ESA, Study of a Satellite Communication System for Wideband Communications" (Executive Summary), Contrat Estec No. 4931/81/NL/GM (SC).

Primary Examiner—M. H. Paschall
Attorney, Agent, or Firm—Spencer & Frank

[57] ABSTRACT

A circuit arrangement for switching PCM channels conducting baseband data signals, with serial data to be switched arriving at n input ports and being converted in blocks to parallel form, intermediately stored in a memory and converted to serial form again after readout to be fed to n output ports each assigned to one or a plurality of destination addresses. The parallel data blocks are intermediately stored the first time in n input registers assigned to the n input ports. Thereafter, a second intermediate storage takes place in a RAM memory in such a manner that the data blocks are written in successively according to the sequence in which they arrived at a memory address which is counted up sequentially, or the data are subsequently intermediately stored in a RAM memory at a memory address which corresponds to the respective destination address. The data blocks are read out according to the number of the output port contained in the destination address or assigned to the destination address or according to their time position and are again intermediately stored in n output registers which are assigned to the respective n output ports.

16 Claims, 6 Drawing Sheets

CIRCUIT ARRANGEMENT FOR NON-BLOCKING SWITCHING OF PCM CHANNELS IN THE SPACE AND TIME DOMAIN

BACKGROUND OF THE INVENTION

The present invention relates to a circuit arrangement for switching PCM channels conducting baseband signals, in which serial data to be switched arrives at n input ports, is converted in blocks to parallel form, is intermediately stored in a memory, and is converted to serial form again after read-out to be fed to n output ports.

Such a circuit arrangement is disclosed in an article entitled "Baseband Switches and Transmultiplexers for Use in an On-Board Processing Mobile/Business Satellite System" by Evans et al, ICDSC 7, pages 587–592, and in "ESA, Study of a Satellite Communication System for Wideband Communications" (Executive Summary), Contrat Estec No. 4931/81/NL/GM (SC).

Some of the solutions disclosed in the literature cannot be realized, at least in the manner described therein, and some are very expensive and require a control computer.

SUMMARY OF THE INVENTION

It is an object of the present invention to provide a circuit arrangement of the above-mentioned type which requires only an inexpensive control unit.

The above and other objects are achieved, according to the present invention, in a circuit arrangement for switching PCM channels conducting baseband signals, the circuit arrangement including n input ports for receiving serial data to be switched, with n being at least 2, first conversion means connected to the input ports for converting serial data received by the input ports into blocks of data in parallel form, memory means for intermediately storing, and subsequently reading, out each block in parallel form, second conversion means connected for converting each block read out from the memory means to serial form, and n output ports each connected to receive the data of respective blocks converted to serial form from the second conversion means, in which the data in each data block formed by the first conversion means is intended to be conducted to a respective output port, the improvement comprising: n input registers each connected to the first conversion means for intermediately storing the parallel data blocks derived from the serial data received at a respective input port; n output registers each connected to the second conversion means, each associated with a respective output port, and each connected for intermediately storing those parallel data blocks read out of the memory means which are intended for the associated output port; and at least one RAM memory forming part of the memory means and having a plurality of memory locations, each memory location having an address associated with one output port, the memory being operable either for writing in data blocks from the input registers, in succession in the order in which the data contained in those data blocks arrives at the input ports, and storing each data block in a memory location associated with the output port to which the data in that block is to be conducted, or for writing in data blocks in succession from the input registers, in the order in which the data contained in those data blocks arrives at the input ports and in successive memory locations, and the memory further being operable for reading out the data blocks stored therein sequentially and for conducting each data block to that one of the output registers which is associated with the output port to which the data in that block is to be conducted.

The circuit arrangement according to the invention has the advantages that it requires only an uncomplicated control system; permits a high data throughput; can be expanded in the form of modules; is able to operate with high reliability; does not require much power; is highly integratable; and can be used for line as well as packet switching. Moreover, circuit arrangements according to the invention permit non-blocking switching of PCM channels in the space and time domain.

The circuit arrangement according to the invention will be described below with reference to the drawing Figures.

DESCRIPTION OF THE PREFERRED EMBODIMENTS

Figure 1:
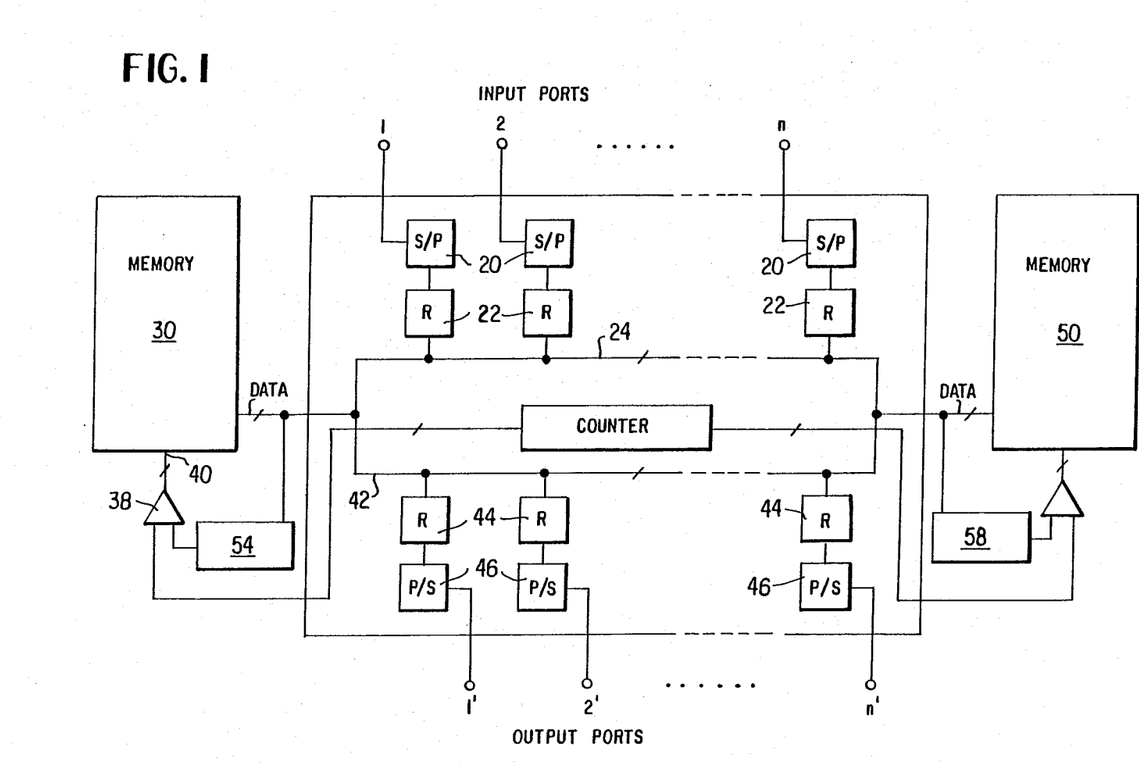
FIG. 1 is a block circuit diagram of one preferred embodiment of the arrangement according to the invention.

FIG. 1 shows a switching device according to the invention having input ports 1, 2, . . . , n arranged to receive serially arriving data to be switched, which data is to then be converted into parallel form in serial/parallel converters 20, after which the parallel data from each converter 20 are intermediately stored as blocks in registers 22. Via bus lines 24, the intermediately stored data blocks are written successively, for example into the left-hand memory 30 together with a memory address which is counted upwards continuously by increment formation as will be described below.

Addressing for the sequential storage of the data blocks in memory 30 is controlled by means of a counter 34 whose one output leads, via a first input of a tristate gate element 38, to the address input 40 of memory 30. Via the other input of tristate gate element 38, destination addresses are fed to address input 40 of memory 30. These destination addresses may be furnished externally, for example, by way of a special signaling channel or by way of frame information (head information), or internally via information bits contained in the data block. For read-out, the correspondingly assigned destination addresses and the memory addresses associated with the latter are called up in dependence on the individual time slots and the data blocks present there are transferred via bus lines 42, and intermediately stored, respectively, in the likewise correspondingly assigned output shift registers 44 to then be converted to serial form in subsequent parallel/serial converters 46 whose outputs are each assigned to a corresponding output port 1', 2', . . . n'.

On the right-hand side of FIG. 1 a further memory 50 is connected with the two bus lines 24 and 42 in the same manner as memory 30 and with counter 34. To permit continuous data flow, memories 30 and 50 are alternatingly written in and read out, write-in to one memory occurring simultaneously with read out from the other memory. Due to the fact that the write-in address of the data blocks can be formed by increments, the control of the circuit according to the invention can be realized very inexpensively by means of a modulo-n counter 34 so that no control memory is required.

Destination address ZA is also converted in an uncomplicated manner into the corresponding memory address to be read out. This is done in respective modules 54 and 58 which are capable of storing the respective address and each of which has a terminal connected to data bus 24 and is thus able to extract the destination address contained in each respective data block.

Due to its modular configuration, the arrangement shown in FIG. 1 can be expanded into a system of any desired size. The separation of the destination address from the information bits of a data block can of course also take place at a different location than the location indicated in FIG. 1, for example at the outputs of serial/parallel converters 20.

Figure 2:
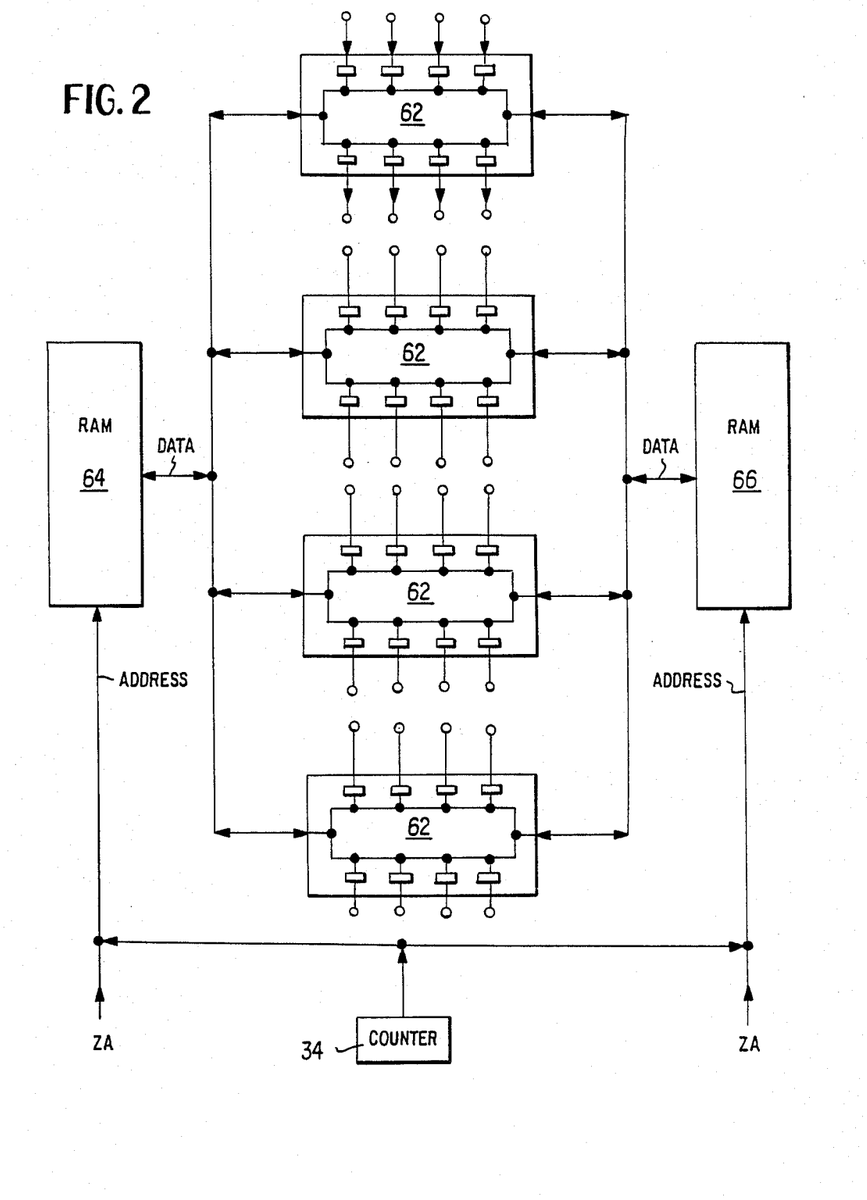
FIGS. 2 and 3 show features of the invention.

A practical embodiment is shown in FIG. 2 in the form of a system having, for example, 12 input ports at which there appear TDM signals multiplexed in a frame having a duration of 1 ms. Each frame is composed, for example, of about 2200 voice channels at 64 bits each. To increase the reliability of the system, four modules 62 are employed which each have four input ports and four output ports. Again, a double memory system, here composed of two RAMs 64 and 66, is provided and the data input and output of the RAMs are connected to one data bus into which the parallel input busses and the parallel output busses, respectively, of the four modules 62 are combined. The address input of the two memories 64 and 66 is connected with the outputs of the counter 34 and with a generator for destination addresses ZA. The two memories 64 and 66 have a capacity, for example, of about 1.7 megabits. As mentioned above, the four identical modules 62 have a total of 12 active ports while the remaining four ports serve as redundance.

Figure 3:
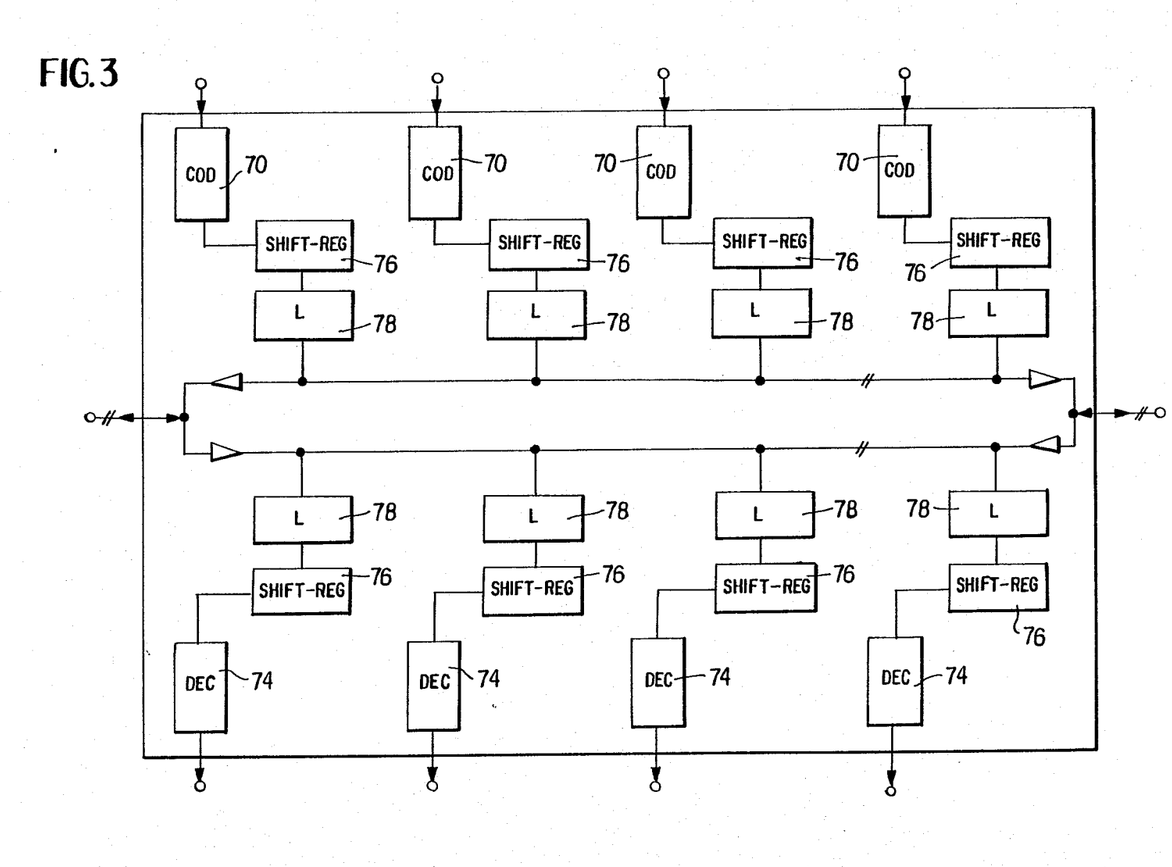

FIG. 3 is a detailed block circuit diagram for a module 62 having four input ports and four output ports, with a coder 70 being connected to each input port and a corresponding decoder 74 being connected upstream of each output port. Each coder 70 produces an error correctable or correcting code so that individual errors can be corrected. The serial/parallel conversion and the parallel/serial conversion, respectively, are each realized by means of a respective shift register 76 while registers R of FIG. 1 are each constituted by a latch 78.

Figure 4:
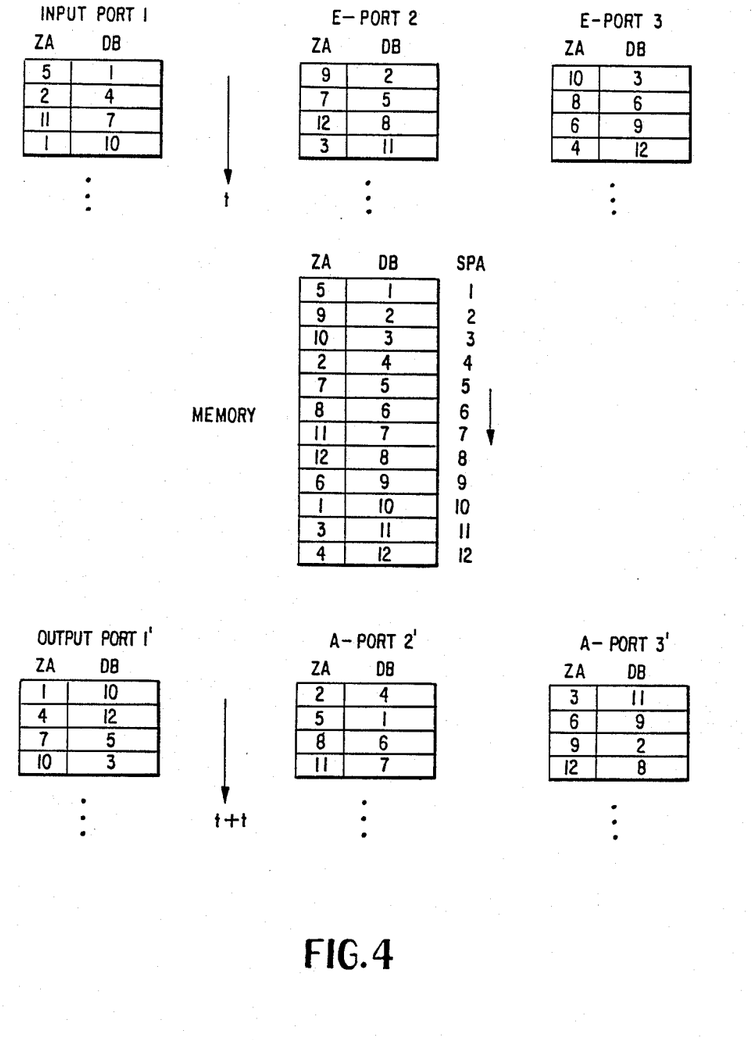
FIG. 4 consists of tables demonstrating the switching of four data blocks which arrive each time at three input ports and are put out at three output ports in a circuit arrangement according to the invention.

FIG. 4 contains a group of tables illustrating the switching of a total of 12 data blocks DB each containing a destination address ZA, with 4 data blocks DB arriving at each of three input ports 1,2,3 and four data blocks DB being outputted at each of three output ports 1',2',3'. The data blocks coming in at the input ports are numbered from 1 to 12; these numbers correspond, for example, to the time sequence of their arrival, and the data blocks are stored incrementally in the memory in the same sequence each at a respective memory address SpA. Read-out is effected as a function of the destination address ZA disposed to the left of each data block DB. The assignment is here such that every third destination address ZA=1, 4, 7, 10, ... is assigned to output port 1', every third destination address ZA=2, 5, 8, 11, ... is assigned to output port 2', and every third destination address ZA=3, 6, 9, 12, ... is assigned to output port 3'. Thus, data blocks DB=10, 12, 5, 3, ... are put out in the listed sequence, after a switching delay $\tau$, at output port 1', data blocks DB=4, 1, 6, 7, ... at output port 2' and data blocks DB=11, 9, 2, 8, ... at output port 3'. The data blocks DB are outputted from the memory to the various output ports in the sequence of addresses ZA. Thus, in FIG. 4, the numerals assigned to the various data blocks DB represent the sequence of their arrival at the various input ports and the numerals assigned to the data block addresses ZA represent the sequence of their delivery to the various output ports.

Figure 5:
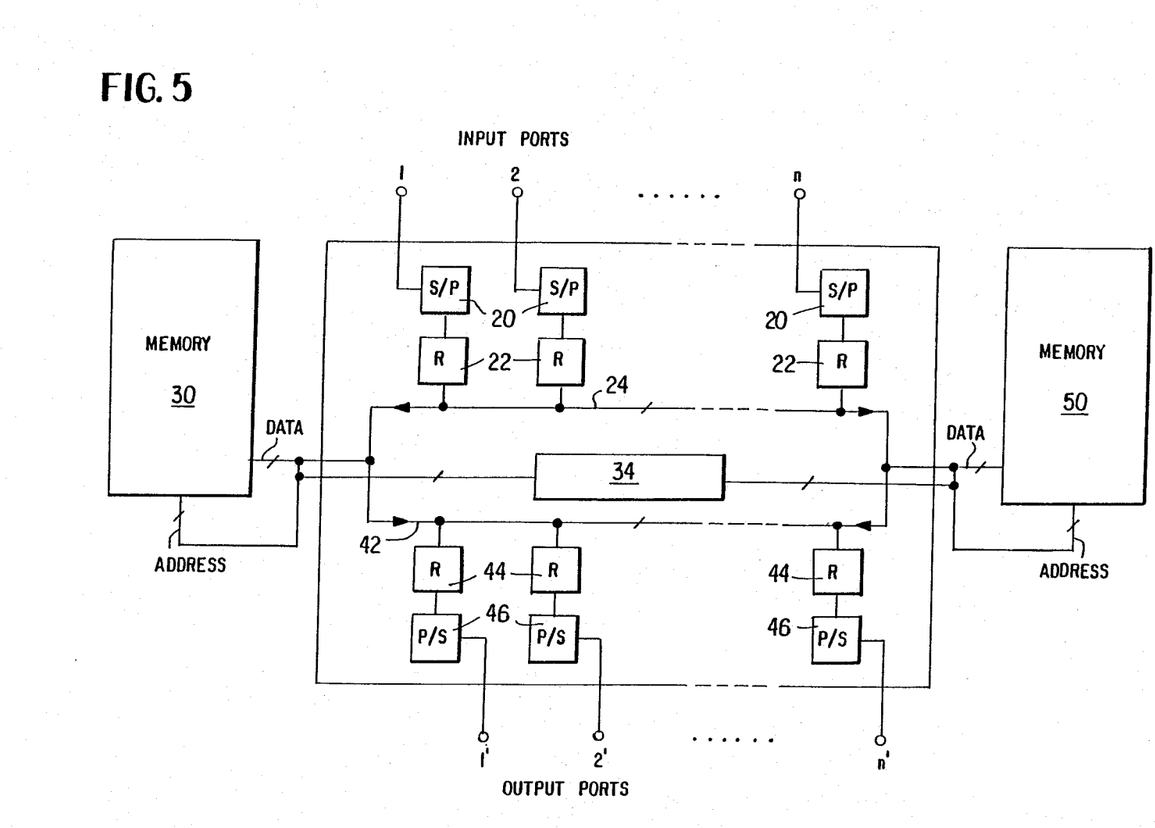
FIG. 5 is a block circuit diagram of a second preferred embodiment of the circuit arrangement according to the invention.

FIG. 5, which is essentially the same as FIG. 1, has input ports 1, 2, ..., n of the switching device according to the invention, with the serially arriving data to be switched being present at these input ports and then being converted into parallel form in serial/parallel converters 20 and thereafter intermediately stored in registers 22. The intermediately stored data blocks are read in succession via bus 24, for example into the left-hand memory 30 at memory addresses which are simultaneously the destination addresses, identifying the assigned output port and time position. This destination address is contained in the data block in addition to the information bits and for that reason, the address input of memory 30 as well as its data input are connected with bus 24 leading from all outputs of input registers 22. Counter 34 whose outputs lead to the address input of memory 30 controls the sequential output of data blocks to the individual output ports 1' to n', with the data output of memory 30 being connected, via further bus 42, with the input of each one of the n output registers 44 in which the data to be switched are intermediately stored to then be converted to serial form in the subsequent parallel/serial converters 46 whose outputs are assigned to the output ports. On the right-hand side of FIG. 5, further memory 50 is connected with the two busses 24 and 42 and with counter 34 in the same manner as memory 30. To permit a continuous flow of data, memories 30 and 50 are written in and read out alternatingly, the write-in to one memory occurring simultaneously with the read out from the other memory.

Due to the fact that the destination address of the data blocks simultaneously serves as a memory address, the control of the circuit arrangement according to the invention becomes very simple and no control memory is required. Due to its modular configuration, the arrangement can easily be expanded into systems of any desired size.

The separation of the destination address from the information bits of a data block can of course also occur at a different location than the location indicated in FIG. 5, for example at the outputs of the serial/parallel converters 20.

All registers 22, 44 are directly connected to the busses 24, 42. The busses 24, 42 are connected to the memories 30, 50 and to the modules 54, 58 via tristate drivers 23, 25. The outputs of registers 22, 44 are switchable into a high impedance mode. The busses have a width of the length of the data blocks including the destination address which can be 64 bits. If 2200 channels are addressed, 12 bits for coding the destination address will be available. The bus lines for transmitting the address bits are branched before the memory inputs and are connected to the address inputs of the memories and to the inputs of the modules 54, 58, respectively.

Figure 6:
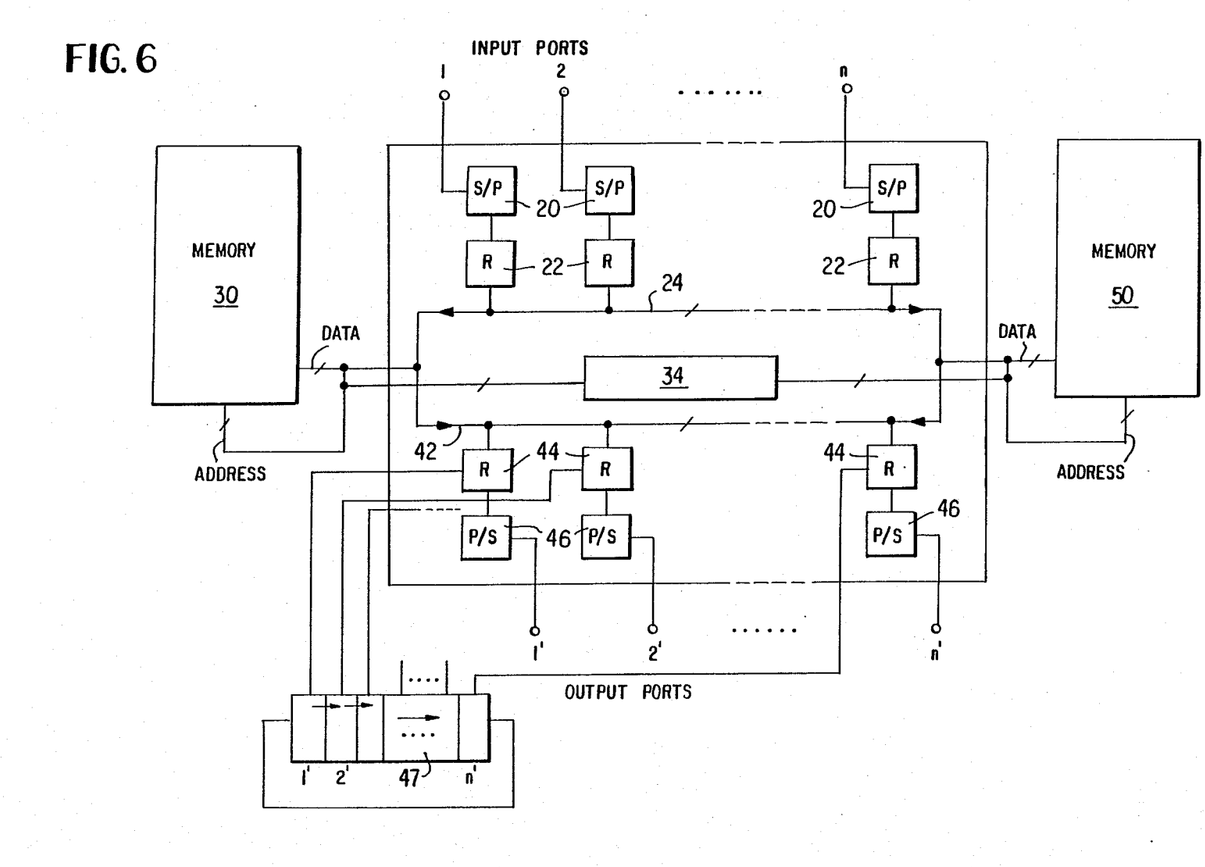
FIG. 6 shows a similar block circuit as FIG. 5 and adds a suitable arrangement for directing the data blocks.

A suitable arrangement for directing each data block (DB) is shown in FIG. 6. The input gates of the output registers 44 are opened if a binary 1 appears at the control input of the proper output register. The sequence is fixed in the arrangement as shown in FIG. 6, where the contents of the shift register 47 is a single binary 1 rotating with the clock of the busses and the memories.

Alternatively, the counter 34 supplies the memories 30, 50 with memory addresses either in a writing mode, according to the arrangement shown in FIG. 5, or in a reading mode, according to the arrangement shown in FIG. 1. If the addresses for both memories are identical at corresponding times, the same output of the counter 34 can be used.

The gate element 38 is a multiplexer for switching either the signals of the module 54 or the counter 34 to the address input of the memory 30, 50 and is controlled by an clock input.

The address input of each memory 30, 50 is only connected to the address lines of the bus.

The function of the coder 70 and the decoder 74 is to detect and correct transmitting errors which may appear in the signal processing area between input and output registers 76 of FIG. 3 or between converters 20 and converters 46 of FIG. 1 and FIG. 5, respectively.

One implementation of this function could be, for instance, a Hamming Code. Generally, the correction bits are generated by the coder 70 for each data block and are transmitted with the corresponding data block. The correction bits are separated from the data block (DB) by the decoder 74, which uses the information of the correction bits for detection and correction of possible errors in the data block. If a Hamming Code is used, the coder 70 and the decoder 74 are built by coupled shift registers. To detect and correct a single bit error, in a data block of the length of 64 bits, 7 correction bits are necessary.

The invention now being fully described, it will be apparent to one of ordinary skill in the art that many changes and modifications can be made thereto without departing from the spirit or scope of the invention as set forth herein.

What is claimed is:

1. In a circuit arrangement for switching PCM channels conducting baseband signals, the circuit arrangement including n input ports for receiving serial data to be switched, with n being at least 2, first conversion means connected to the input ports for converting serial data received by the input ports into blocks of data in parallel form, memory means for intermediately storing, and subsequently reading, out each block in parallel form, second conversion means connected for converting each block read out from the memory means to serial form, and n output ports each connected to receive the data of respective blocks converted to serial form from the second conversion means, in which the data in each data block formed by the first conversion means is intended to be conducted to a respective output port, the improvement comprising: n input registers each connected to said first conversion means for intermediately storing the parallel data blocks derived from the serial data received at a respective input port; n output registers each connected to said second conversion means, each associated with a respective output port, and each connected for intermediately storing those parallel data blocks read out of said memory means which are intended for the associated output port; and least one RAM memory forming part of said memory means and having a plurality of memory locations, each memory location having an address associated with one output port, said memory being operable for writing in data blocks from said input registers, in succession in the order in which the data contained in those data blocks arrives at said input ports, and storing each data block in a memory location associated with the output port to which the data in that block is to be conducted, and said memory further being operable for reading out the data blocks stored therein sequentially and for conducting each data block to that one of said output registers which is associated with the output port to which the data in that block is to be conducted.

2. Circuit arrangement as defined in claim 1 wherein there are two said RAM memories connected and operated such each said memory is alternatingly read out and written into, with one said memory being read out while the other said memory is written into.

3. Circuit arrangement as defined in claim 1 further comprises a counter connected for controlling the sequential writing of the data blocks to said memory.

4. Circuit arrangement as defined in claim 1 wherein the serial data arriving at said input ports includes destination information identifying the output port to which that data is to be conducted, and further comprising separating means connected for separating the destination information from the data before each data block is written into said memory.

5. Circuit arrangement as defined in claim 1 wherein information identifying the output port to which the data in each data block is to be conducted is supplied to said arrangement from an external source.

6. Circuit arrangement as defined in claim 1 further comprising means for subjecting th serial data arriving at said input ports to coding so as to generate an error correctable or error correcting code and means for subjecting the serial data arriving at said output ports to a corresponding decoding.

7. Circuit arrangement as defined in claim 1 wherein the serial data supplied to said input ports are present as 64-bit TDM signals within a frame of about 2200 voice channels and are supplied to each input port with a frame duration of 1 ms.

8. Circuit arrangement as defined in claim 1 composed of a plurality of modules each having four said input ports and four said output ports.

9. In a circuit arrangement for switching PCM channels conducting baseband signals, the circuit arrangement including n input ports for receiving serial data to be switched, ith n being at least 2, first conversion means connected to the input ports for converting serial data received by the input ports into blocks of data in parallel form, memory means for intermediately storing, and subsequently reading, out each block in parallel form, second conversion means connected for converting each block read out from the memory means to serial form, and n output ports each connected to receive the data of respective blocks converted to serial form from the second conversion means, in which the data in each data block formed by the first conversion means is intended to be conducted to a respective output port, the improvement comprising: n input registers each connected to said first conversion means for intermediately storing the parallel data blocks derived from the serial data received at a respective input port; n output registers each connected to said second conversion means, each associated with a respective output port, and each connected for intermediately storing those parallel data blocks read out of said memory means which are intended for the associated output port; and least one RAM memory forming part of said memory means and having a plurality of memory locations, said memory being operable for writing in data blocks in succession from said input registers, in the order in which the data contained in those data blocks arrives at said input ports and in successive memory locations, said memory further being operable for reading out the data blocks stored therein sequentially and for conducting each data block to that one of said output registers which is associated with the output port to which the data in that block is to be conducted.

10. Circuit arrangement as defined in claim 9 wherein there are two said RAM memories connected and operated such each said memory is alternatingly read out and written into, with one said memory being read out while the other said memory is written into.

11. Circuit arrangement as defined in claim 9 further comprising a counter connected for controlling the sequential writing in of the data blocks to said memory.

12. Circuit arrangement as defined in claim 9 wherein the serial data arriving at said input ports includes destination information identifying the output port to which that data is to be conducted, and further comprising separating means connected for separating the destination information from the data before each data block is written in to said memory.

13. Circuit arrangement as defined in claim 9 wherein information identifying the output port to which the data in each data block is to be conducted is supplied to said arrangement from an external source.

14. Circuit arrangement as defined in claim 9 further comprising means for subjecting the serial data arriving at said input ports to coding so as to generate an error correctable or error correcting code and means for subjecting the serial data arriving at said output ports to a corresponding decoding.

15. Circuit arrangement as defined in claim 9 wherein the serial data supplied to said input ports are present as 64-bit TDM signals within a frame of about 2200 voice channels and are supplied to each input port with a frame duration of 1 ms.

16. Circuit arrangement as defined in claim 9, composed of a plurality of modules each having four said input ports and four said output ports.

* * * * *